(12) United States Patent
Beierl et al.

(10) Patent No.: US 7,766,412 B2
(45) Date of Patent: Aug. 3, 2010

(54) MOVABLE VEHICLE ROOF

(75) Inventors: Dominik Beierl, Korntal-Münchingen (DE); Thiemo Adolf Erb, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 422 days.

(21) Appl. No.: 11/852,523

(22) Filed: Sep. 10, 2007

(65) Prior Publication Data
US 2008/0061583 A1 Mar. 13, 2008

(30) Foreign Application Priority Data
Sep. 8, 2006 (DE) .................. 10 2006 042 294

(51) Int. Cl.
*B60J 7/08* (2006.01)
(52) U.S. Cl. .............. 296/107.17; 296/108; 296/107.06
(58) Field of Classification Search ............ 296/107.17, 296/107.16, 107.15, 108, 107.06
See application file for complete search history.

(56) References Cited

U.S. PATENT DOCUMENTS 6,866,323 B2 * 3/2005 Guillez et al. .......... 296/107.17
7,152,904 B2 12/2006 Bogenschuetz et al.

FOREIGN PATENT DOCUMENTS

| DE | 734382 | 4/1943 |
| DE | 102 59 482 A1 | 7/2004 |
| DE | 10 2004 009 080 A1 | 9/2005 |
| WO | 2005/083676 A1 | 9/2005 |

* cited by examiner

*Primary Examiner*—Joseph D Pape

(57) ABSTRACT

A movable vehicle roof has a plurality of segments which are movable relative to one another, in particular are displaceable and/or pivotable, and of which at least one has a core containing a filling structure forming cavities. The filling structure core is provided with a retaining part which engages around it in some regions at least on one side and, together with lateral elements disposed on it as a single piece, forms at least one intersecting point with the top framework.

12 Claims, 2 Drawing Sheets

MOVABLE VEHICLE ROOF

CROSS-REFERENCE TO RELATED APPLICATION

This application claims the priority, under 35 U.S.C. §119, of German application DE 10 2006 042 294.5, filed Sep. 8, 2006; the prior application is herewith incorporated by reference in its entirety.

BACKGROUND OF THE INVENTION

Field of the Invention

The invention relates to a movable vehicle roof with a plurality of segments which are movable relative to one another, in particular are displaceable and/or pivotable with respect to one another, and of which at least one has a core containing a filling structure forming cavities.

When, in this connection, a movable vehicle roof is discussed, it includes "retractable hardtops" (RHT) and also classic convertibles which have a flexible top covering at least in some regions as the outer skin of the roof. Mixed forms of these two movable forms of vehicle roofs are conceivable, for example a movable vehicle roof which partially contains fixed roof parts and partially contain regions spanned by a flexible roof skin.

It is known from published, non-prosecuted German patent application DE 10 2004 009 080 A1 to provide an acoustic absorber as a segment in a movable vehicle roof. The acoustic absorber serves as a device for damping soundwaves in a vehicle roof and preferably contains a honeycomb structure, for example a paper honeycomb structure.

Furthermore, it has already been disclosed to cushion sheet-like elements, which engage under a roof skin, in some regions or to provide them with other contour-forming supporting elements.

SUMMARY OF THE INVENTION

It is accordingly an object of the invention to provide a movable vehicle roof which overcomes the above-mentioned disadvantages of the prior art devices and methods of this general type, which can be produced in a simple manner and at reasonable cost and has improved damping properties. The shaping of the vehicle roof contour is not restricted, and an integral configuration of the sheet-like roof element together with retaining parts adjacent to the top framework is formed.

With the foregoing and other objects in view there is provided, in accordance with the invention, a movable vehicle roof. The vehicle roof contains a plurality of segments being movable relative to one another and at least one of the segments contains a core having a filling structure defining cavities therein. The core has a retaining part engaging around the filling structure in some regions at least on one side. The retaining part has lateral elements extending from it and formed as a single piece unit. The retaining part together with the lateral elements form at least one intersecting point with a top framework.

According to the invention, first of all a section of the filling structure core is provided, the filling structure core is provided with retaining parts, in particular sheet-like top layers, which engage around it in some regions at least on one side, but preferably on both sides, and to which lateral elements, which serve as an intersecting point with the actual top framework, are fitted as a single piece. This creates integrated panel parts which can be subjected to a high load, have good damping properties, have a relatively low weight and in which forces which are introduced by the top framework are transmitted in a sheet-like manner into the filling structure core. This is based on the integral and, in particular, single-piece connection of the retaining part and the transition thereof into the filling structure core which can be configured in an advantageous manner as a paper honeycomb core. The core can have very different contour shapes, it is possible to press it into shape beforehand and/or to undertake the final shaping during a casting or injection operation, in which it is provided with the top layers.

The retaining part engages over the filling structure core at least in some regions on the upper and lower side; it is formed from a polyurethane matrix or another glass fiber material which appears suitable to a person skilled in the art in the field of the invention.

In a further embodiment of the invention, the filling structure core or the sheet-like retaining part is provided with an at least single-layer inside headlining on the lower side which faces the interior. When, in this context, "at least single layer" is discussed, it includes the fact that, first of all, an intermediate layer can be disposed on the lower side of the filling structure core or retaining part, onto which intermediate layer the inside headlining (inside headlining layer) which is visible to the user is then fitted. In the preferred embodiment, the intermediate layer is a soft polyethylene foam layer with a thickness of approximately 3 mm, and the actual inside headlining may be of much thinner configuration and may have, for example, a textile structure.

In a further embodiment, the filling structure core or the outwardly directed side of the retaining part is connected to an elastic supporting layer, in particular a foam layer or the like, in order to ensure uniform support of a textile or other roof skin.

The vehicle roof skin, which is supported by the sheet-like element formed by the filling structure, can be fastened to the sheet-like element in a conventional manner.

The method claims are concerned with a particularly economic and targeted reduction of the movable vehicle roof described above.

As far as the method is concerned, it is provided that first of all a section of a paper honeycomb structure is prepared, the section being cut or punched into a suitable size. Encapsulation of the section of the paper honeycomb structure at least in some regions by injection molding or casting then takes place, with the retaining part being formed, and with lateral regions of the retaining part merging in the manner of links or struts to form an intersecting point of the top framework.

Finally, at least one layer of an inside headlining is fitted to that surface of the retaining part or of the paper honeycomb structure which faces the interior. The link which is formed by a lateral element of the retaining part has to be configured in such a manner that the sheet-like part disposed thereon can be correspondingly controlled during the opening and closing movement of the roof.

In a development of the method, it is provided that an elastic outer layer is also fitted on the outside/upper side of the sheet-like element and serves to elastically and uniformly support a flexible roof skin.

Other features which are considered as characteristic for the invention are set forth in the appended claims.

Although the invention is illustrated and described herein as embodied in a movable vehicle roof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
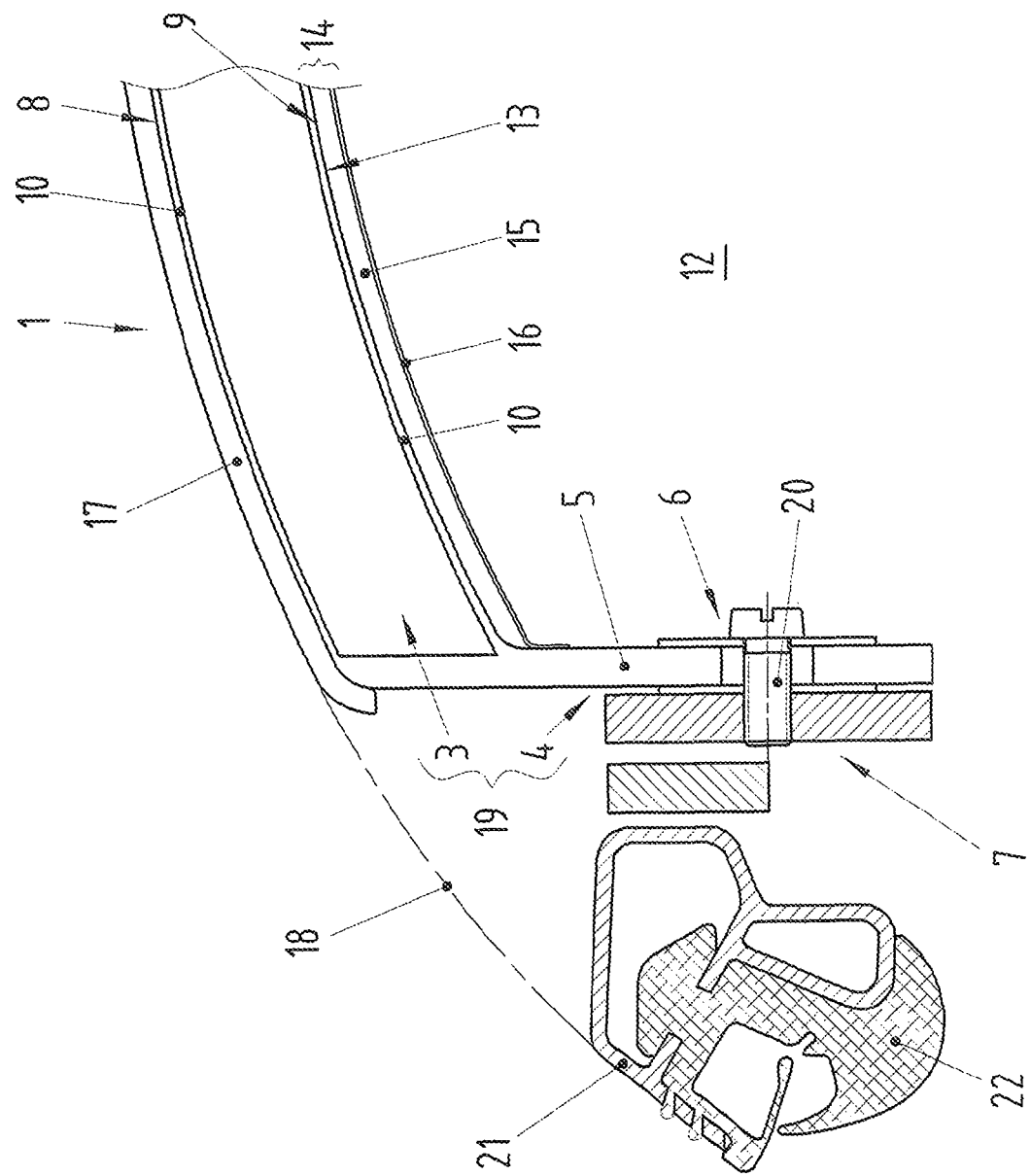
FIG. 1 is a diagrammatic, sectional view of a roof segment with parts of a top framework according to the invention.

Referring now to the figures of the drawing in detail and first, particularly, to FIG. 1 thereof, there is shown a roof segment 1 which is illustrated in section and belongs to a plurality of segments 1 of a movable vehicle roof, which segments are movable relative to one another, in particular are displaceable and/or pivotable. At least one of the roof segments 1 has a core containing a filling structure 3 defining cavities 2. In this case, the filling structure core 3 is provided with a retaining part 4 which engages around it in some regions at least on one side and, together with lateral elements 5 disposed on it as a single piece, forms at least one intersecting point 6 with a top framework 7.

Figure 2:
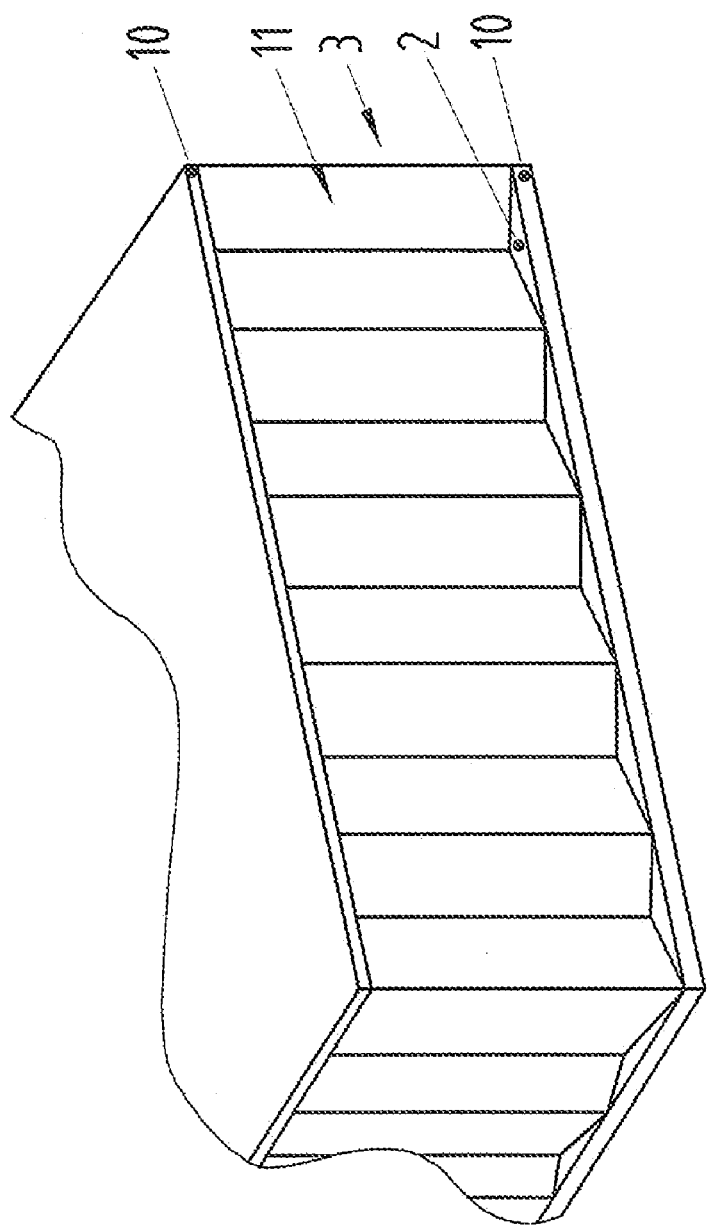
FIG. 2 is a perspective, partial view a filling structure and parts of the retaining part.

In the embodiment illustrated in drawing FIG. 1, the retaining part 4 engages around the filling structure core 3 both on an upper side 8 and on a lower side 9. The retaining part 4 is preferably connected to the filling structure core 3 in a shaping manner, in particular is pressed onto it and/or cast into it, and forms a top layer 10 at least in some regions on the filling structure core 3. This emerges in particular from FIG. 2. The filling structure core 3 is illustrated there as a paper honeycomb structure 11, and it can clearly be seen how regions of the retaining part 4 enter into a cohesive material connection with the upper side 8 and the lower side 9 of the filling structure core 3 as a consequence of being pressed onto or cast into the cavities of the filling structure core 3, and form the top layer 10 on the upper side and lower side. The retaining part 4 may contain a polyurethane matrix and/or glass fiber mats.

At least one single-layer inside headlining section 14 is disposed on that surface 13 of the filling structure core 3 and/or of the retaining part 4 which faces the vehicle interior 12. In the embodiment illustrated in drawing FIG. 1, the inside headlining section 14 contains two layers, namely an intermediate layer 15 including a soft polyethylene foam, and a finishing inside headlining layer 16 manufactured from a textile material. Only the inside headlining layer 16 is visible to the passenger from the interior and may also be manufactured, for example, from other materials, such as leather or plastic.

The filling structure core 3 is provided with an elastic supporting layer 17 on that surface of the roof segment 1 which lies opposite the inside headlining section 14, i.e. the side directed outward when the top is closed. The supporting layer 17 of this type is advantageous in particular when a flexible vehicle roof is provided which has a flexible roof skin 18, and the latter is supported by sheet-like supporting elements 19 which are formed from the roof segments 1. Therefore the roof segments 1 according to the invention, which have the filling structure core 3 and the retaining parts 4 connected thereto, form a sheet-like supporting element 19 for a flexible vehicle roof skin 18. In this case, the vehicle roof skin 18 is fastened at least in some regions to at least one of the supporting elements 19.

The elastic supporting layer 17 serves, first, to gently support the vehicle roof skin 18 and, second, makes it possible, irrespective of the shape of the outer contour of the filling structure core 3, to ensure a defined shape of the vehicle roof skin 18 when the vehicle roof is closed.

The intersecting point 6 between the lateral element 5 and the top framework 7 is to contain at least one articulated connection; the latter can be realized, for example, by a screw 20 which is mounted rotateably at least to one connecting partner.

As is likewise apparent from drawing FIG. 1, the vehicle roof skin 18 is connected on the end side to lateral roof frame parts 21 of the top framework 7. The lateral roof frame part 21 has a sealing element 22 which serves to seal side windows.

The invention claimed is:

1. A movable vehicle roof, comprising:
a plurality of segments being movable relative to one another and at least one of said segments containing a core having a filling structure defining cavities therein, said core having a retaining part engaging around said filling structure in some regions and at least on one side, said retaining part formed as a single piece unit and having lateral elements said lateral elements forming at least one intersecting point for a top framework.

2. The movable vehicle roof according to claim 1, wherein said retaining part engages over said filling structure at least in said some regions on an upper side and a lower side of said filling structure.

3. The movable vehicle roof according to claim 1, wherein said retaining part is connected to said filling structure in a shaping manner and forms a top layer at least in said some regions on said filling structure.

4. The movable vehicle roof according to claim 1, wherein said retaining part is formed of at least one of a polyurethane matrix and glass fiber mats.

5. The movable vehicle roof according to claim 1, wherein said filling structure contains a paper honeycomb structure.

6. The movable vehicle roof according to claim 1, further comprising an at least single-layer inside headlining section disposed on a surface of one of said filling structure and said retaining part, facing a vehicle interior.

7. The movable vehicle roof according to claim 1, further comprising an elastic supporting layer disposed on said core on a side directed outward when the movable vehicle roof is closed.

8. The movable vehicle roof according to claim 1, wherein said intersecting point between said lateral elements and said top framework includes an articulated connection.

9. The movable vehicle roof according to claim 1, wherein said filling structure together with said retaining part forms a sheet-shaped supporting element for a flexible vehicle roof skin.

10. The movable vehicle roof according to claim 9, wherein said vehicle roof skin is fastened at least in some regions to said sheet-shaped supporting element.

11. The movable vehicle roof according to claim 1, wherein said segments being movable relative to one another are at least one of displaceable and pivotable relative to one another.

12. The movable vehicle roof according to claim 3, wherein said retaining part is connected to said filling structure by one of being pressed onto said filling structure and being cast into said filling structure.

* * * * *